US012715735B2

(12) United States Patent
Hoinkis et al.

(10) Patent No.: US 12,715,735 B2
(45) Date of Patent: Aug. 25, 2026

(54) SETTING A RESCUE TIME PERIOD

(71) Applicant: Otis Elevator Company, Farmington, CT (US)

(72) Inventors: Matthias Hoinkis, Berlin (DE); Sebastian Gehrke, Berlin (DE); Jan Ruhnke, Berlin (DE); Peter Herkel, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 954 days.

(21) Appl. No.: 17/987,531

(22) Filed: Nov. 15, 2022

(65) Prior Publication Data

US 2024/0076163 A1 Mar. 7, 2024

(30) Foreign Application Priority Data

Sep. 5, 2022 (EP) .................................... 22193981

(51) Int. Cl.
*B66B 5/16* (2006.01)
*B66B 1/34* (2006.01)
*B66B 5/02* (2006.01)

(52) U.S. Cl.
CPC .............. *B66B 5/16* (2013.01); *B66B 1/3407* (2013.01); *B66B 1/3423* (2013.01); *B66B 5/027* (2013.01)

(58) Field of Classification Search
CPC ......... B66B 5/16; B66B 5/027; B66B 1/3407; B66B 1/3423
USPC .......................................................... 187/393
See application file for complete search history.

(56) References Cited

U.S. PATENT DOCUMENTS 5,241,141 A * 8/1993 Cominelli ............... B66B 1/285 187/293
6,196,355 B1 * 3/2001 Fargo ...................... B66B 5/027 187/393
6,405,834 B1 * 6/2002 Chida .................. B66B 11/001 187/391

(Continued)

FOREIGN PATENT DOCUMENTS

BR 112021008405 A2 * 9/2021 ............. B66B 5/027
CN 103863908 A 6/2014

(Continued)

OTHER PUBLICATIONS

European Search Report for application EP 22193981.2, dated Feb. 16, 2023, 55 pages.

*Primary Examiner* — Christina M Schreiber
(74) *Attorney, Agent, or Firm* — CANTOR COLBURN LLP

(57) ABSTRACT

A method of learning a rescue time period by an elevator system (101). The elevator system (101) includes an elevator car (103) moved by a machine (111) and a machine brake (120), arranged such that braking of the machine (111) by the machine brake (120) brakes motion of the elevator car (103). The method includes releasing the machine brake (120) for at least one test time period, at the end of which the machine brake (120) is engaged, detecting a corresponding at least one maximum travel speed of the elevator car (103) reached as a result of releasing the machine brake (120) for each at least one test time period, checking whether each at least one maximum travel speed is an acceptable speed, and setting the rescue time period based upon said checking.

19 Claims, 5 Drawing Sheets

(56) References Cited

U.S. PATENT DOCUMENTS

| | | | | |
|---|---|---|---|---|
| 6,802,395 | B1 * | 10/2004 | Helstrom | B66B 1/32 187/247 |
| 7,434,664 | B2 * | 10/2008 | Helstrom | B66B 5/027 187/314 |
| 7,533,763 | B2 * | 5/2009 | Kattainen | B66B 1/28 187/394 |
| 7,549,515 | B2 * | 6/2009 | Tegtmeier | B66B 5/027 187/290 |
| 7,909,145 | B2 * | 3/2011 | Erny | B66D 5/30 188/1.11 E |
| 7,926,621 | B2 * | 4/2011 | Kawai | B66B 5/024 187/387 |
| 7,931,127 | B2 * | 4/2011 | Kondo | B66B 1/32 187/277 |
| 7,963,372 | B2 * | 6/2011 | Hikita | B66B 5/021 187/390 |
| 8,316,996 | B2 * | 11/2012 | Hashimoto | B66B 1/32 187/288 |
| 8,365,873 | B2 * | 2/2013 | Viita-Aho | B66B 5/0031 187/314 |
| 8,752,677 | B2 * | 6/2014 | Harkonen | B66B 1/32 187/391 |
| 10,519,004 | B2 * | 12/2019 | Nishida | B66B 5/021 |
| 11,046,553 | B2 * | 6/2021 | Cheng | B66B 5/027 |
| 11,084,688 | B2 * | 8/2021 | Hall | G01R 31/396 |
| 11,192,752 | B2 * | 12/2021 | Camenzind | B66B 5/027 |
| 11,352,235 | B2 * | 6/2022 | Kattainen | B66B 5/027 |
| 2008/0202859 | A1 * | 8/2008 | Tegtmeier | B66B 5/027 187/288 |
| 2010/0170751 | A1 * | 7/2010 | Hashimoto | B66B 1/32 187/288 |
| 2012/0080273 | A1 * | 4/2012 | Herkel | B66B 1/34 187/290 |
| 2016/0280507 | A1 * | 9/2016 | Kattainen | B66B 5/027 |
| 2017/0313548 | A1 * | 11/2017 | Nakari | B66B 5/027 |
| 2018/0059189 | A1 * | 3/2018 | Spielbauer | B66B 5/027 |
| 2019/0062111 | A1 * | 2/2019 | Agirman | B66B 5/027 |
| 2019/0210837 | A1 * | 7/2019 | Herkel | B66B 1/3461 |
| 2021/0395041 | A1 * | 12/2021 | Jussila | B66B 9/00 |
| 2022/0048735 | A1 * | 2/2022 | Nikander | B66B 1/42 |
| 2022/0055861 | A1 * | 2/2022 | Sonnenmoser | B66B 5/027 |
| 2024/0076163 | A1 * | 3/2024 | Hoinkis | B66B 1/3423 |
| 2024/0109754 | A1 * | 4/2024 | Uslu | B66B 5/027 |

FOREIGN PATENT DOCUMENTS

| | | | | | |
|---|---|---|---|---|---|
| CN | 105460712 | A | | 4/2016 | |
| CN | 107473044 | A | | 12/2017 | |
| CN | 109110605 | A | | 1/2019 | |
| CN | 112027846 | A | | 12/2020 | |
| CN | 112912328 | A | * | 6/2021 | B66B 5/06 |
| CN | 112978533 | A | | 6/2021 | |
| CN | 113336038 | A | | 9/2021 | |
| CN | 113659698 | A | | 11/2021 | |
| CN | 113860109 | A | | 12/2021 | |
| EP | 1510492 | A1 | | 3/2005 | |
| EP | 1953107 | A1 | | 8/2008 | |
| EP | 1958909 | A1 | | 8/2008 | |
| EP | 1802547 | B1 | | 9/2008 | |
| EP | 1988048 | A1 | | 11/2008 | |
| EP | 1990305 | A1 | | 11/2008 | |
| EP | 2019071 | A1 | | 1/2009 | |
| EP | 2048103 | A1 | | 4/2009 | |
| EP | 2060528 | A1 | | 5/2009 | |
| EP | 2085348 | A1 | | 8/2009 | |
| EP | 2168901 | A1 | | 3/2010 | |
| EP | 2221267 | A1 | | 8/2010 | |
| EP | 2020395 | B1 | | 1/2011 | |
| EP | 1838606 | B1 | | 5/2011 | |
| EP | 2347986 | | | 7/2011 | |
| EP | 2457861 | A1 | | 5/2012 | |
| EP | 2660179 | A1 | | 11/2013 | |
| EP | 2287102 | B1 | | 7/2016 | |
| EP | 2141108 | B1 | | 12/2016 | |
| EP | 2217519 | B1 | | 3/2017 | |
| EP | 3228572 | A1 | | 10/2017 | |
| EP | 3245151 | A1 | | 11/2017 | |
| EP | 2117983 | B1 | | 9/2018 | |
| EP | 3003946 | A1 | | 10/2018 | |
| EP | 3044152 | B1 | | 12/2018 | |
| EP | 3210922 | B1 | | 8/2019 | |
| EP | 3210923 | B1 | | 8/2019 | |
| EP | 3519338 | A1 | | 8/2019 | |
| EP | 3524561 | A1 | | 8/2019 | |
| EP | 3072842 | B1 | | 9/2019 | |
| EP | 3597582 | A1 | | 1/2020 | |
| EP | 3122676 | B1 | | 10/2020 | |
| EP | 3403971 | B1 | | 10/2020 | |
| EP | 3539913 | B1 | | 4/2021 | |
| EP | 3480155 | B1 | | 11/2021 | |
| EP | 3925914 | A1 | | 12/2021 | |
| EP | 3954642 | A1 | | 2/2022 | |
| EP | 3992129 | A1 | | 5/2022 | |
| JP | 2012532076 | A | * | 12/2012 | B66B 5/027 |
| JP | 2013091572 | A | * | 5/2013 | |
| JP | 2014101181 | A | * | 6/2014 | |

* cited by examiner

SETTING A RESCUE TIME PERIOD

FOREIGN PRIORITY

This application claims priority to European Patent Application No. 22193981.2, filed Sep. 5, 2022, and all the benefits accruing therefrom under 35 U.S.C. § 119, the contents of which in its entirety are herein incorporated by reference.

TECHNICAL FIELD

This disclosure relates to a method of learning a rescue time period by an elevator system, a method of operating an elevator system, a rescue time period learning system and an elevator system.

BACKGROUND

When an elevator car undergoes an emergency stop, it sometimes ends up stopped between landings of an elevator system. With the elevator car in that position safe debarkation of passengers from the elevator car is not possible. The emergency stop may be triggered, for example, by detection of a malfunction of a component of the elevator system or by a passenger pressing an emergency stop button.

In such circumstances the elevator car is moved to a nearby landing of the elevator system using a manual rescue operation, also referred to just as a rescue operation. The rescue operation may be carried out by a maintenance person from a control panel external to the elevator car, or may be carried out automatically by an elevator control system. The result of the rescue operation is that it allows passengers to be rescued from inside the elevator car. During a rescue operation, it is known to lift the machine brake for a pre-set time period. If no movement of the elevator car is detected as a result of lifting the machine brake then the machine brake is re-engaged as it is expected that one or more motion sensors of the elevator system are malfunctioning. This process can then be repeated as needed to shift the elevator car gradually to the nearest suitable landing. If the sensors of the elevator system appear to be operating properly, and motion is detected, then the machine brake can be left open and normal control of the elevator car motion by the elevator controller can be resumed.

According to the present disclosure there is provided an improved method of setting a rescue time period.

SUMMARY

According to a first aspect of this disclosure there is provided a method of learning a rescue time period by an elevator system, the elevator system comprising an elevator car moved by a machine and a machine brake, arranged such that braking of the machine by the machine brake brakes motion of the elevator car, the method comprising: releasing the machine brake for at least one test time period, at the end of which the machine brake is engaged; detecting a corresponding at least one maximum travel speed of the elevator car reached as a result of releasing the machine brake for each at least one test time period; checking whether each at least one maximum travel speed is an acceptable speed; and setting the rescue time period based upon said checking.

According to a second aspect of this disclosure there is provided a rescue time period learning system for an elevator system, the elevator system comprising an elevator car moved by a machine and a machine brake, arranged such that braking of the machine by the machine brake brakes motion of the elevator car; the rescue time period learning system configured to carry out a method, comprising: releasing the machine brake for at least one test time period, at the end of which the machine brake is engaged; detecting a corresponding at least one maximum travel speed of the elevator car reached as a result of releasing the machine brake for each at least one test time period; checking whether each at least one maximum travel speed is an acceptable speed; and setting the rescue time period based upon said checking.

According to a third aspect of this disclosure there is provided an elevator system, comprising: an elevator car; a machine, arranged to move the elevator car; a machine brake, arranged to brake the machine, wherein braking of the machine by the machine brake brakes motion of the elevator car; and a rescue time period learning system, the rescue time period learning system arranged to: release the machine brake for at least one test time period, at the end of which the machine brake is engaged; detect a corresponding at least one maximum travel speed of the elevator car reached as a result of releasing the machine brake for each at least one test time period; check whether each at least one maximum travel speed is an acceptable speed; and set the rescue time period based upon said checking.

Ideally the rescue time period for which the machine brake is opened during the rescue operation should be such that some movement of the elevator car occurs as a result of lifting the machine brake for the pre-set time period, but that the elevator car does not reach an undesirably high speed. The amount of movement and the speed can vary from one system to another such that a standardised rescue time period is not always appropriate. By setting a rescue time period based on checking at least one maximum speed reached by the elevator car as a result of lifting the machine brake for the duration of a test time period, the rescue time period can be better optimised for the particular elevator installation in which the testing is carried out. In other words, testing is carried out in one particular elevator installation and used to set the rescue time period used in that specific elevator installation, such that the rescue time period is optimised for that specific elevator installation. This may help to reduce wear on the machine brake, since it will only ever need to brake the elevator car during rescue from an acceptable speed, and it therefore does not have to brake the elevator car from an excessively high speed during a rescue operation. This method may be particularly advantageous in systems that are "modernized" i.e. contain a mixture of older and newer parts, since the brake lifting time required to achieve movement of an elevator car in such an elevator system is not well-known or standardized, and so a pre-set rescue time period (i.e., not specific to that system) will likely not be optimum for such a system.

It will be understood that an acceptable speed may be a speed that is acceptable for a rescue operation e.g., a passenger rescue operation. An acceptable speed may be a speed within an acceptable speed range. Thus, the method may comprise checking whether each at least one maximum travel speed is within an acceptable speed range. The acceptable speed range may be open ended in one direction. Thus, checking whether each at least one maximum travel speed is within an acceptable speed range may comprise (or consist of) checking that the maximum travel speed is over a threshold speed or checking that the maximum travel speed is under a threshold speed, or alternatively it may comprise both checks.

In some examples an acceptable speed comprises a speed that is greater than or equal to a minimum speed threshold. Optionally the minimum speed threshold is 0.1 m/s. This may be the only condition for a speed to be an acceptable speed, or there may be additional conditions, e.g., being below a maximum speed threshold.

In some examples, additionally or alternatively, an acceptable speed comprises a speed that is less than or equal to a maximum speed threshold. Optionally the maximum speed threshold is 0.3 m/s. Thus, where both of these conditions hold, an acceptable speed may be a speed that is between the minimum speed threshold and the maximum speed threshold, e.g., 0.1-0.3 m/s. This is a particularly desirable speed range for travel during a rescue operation since it is a sufficiently fast that the elevator car will move a reasonable distance during the period when the machine brake is lifted, thus increasing the chance that the elevator car moves close enough to a floor of the elevator system to allow rescue, but sufficiently slow that the passengers will not be harshly jolted when the machine brake is re-engaged and also wear to the machine brake is not excessive.

The maximum travel speed may be reached by the elevator car during each test time period (e.g., as opposed to being reached after the end of the test time period). Thus, the method may comprise detecting a corresponding at least one maximum travel speed of the elevator car reached during each at least one test time period.

In some examples, each at least one test time period is greater than or equal to a minimum threshold time period. This avoids wasting a test run on a test time period that will certainly be too short to achieve a maximum travel speed that is an acceptable speed. The minimum threshold time period may be at least 300 ms, 400 ms or 500 ms. The minimum threshold time period may be no more than 500 ms, 600 ms or 700 ms. In some particular examples, the minimum threshold time period is 500 ms.

In some examples, each at least one test time period is less than or equal to a maximum threshold time period. This avoids opening the machine brake for very long test time periods, that are very likely to result in a maximum travel speed that is too high. Braking from such high speeds would also cause increased wear to the machine brake.

In some examples, the method further comprises, if no test time period results in a maximum travel speed that is an acceptable speed, setting the maximum threshold time period as the rescue time period. As a result, the rescue time period will never be set as a time period that is greater than the maximum threshold time period, even where no time periods below the maximum threshold time period result in an acceptable maximum travel speed. This prevents the rescue time period being set as an excessively long time period. The maximum threshold time period may be at least 1000 ms, 1500 ms, 2000 ms, 2500 ms or 3000 ms. The maximum threshold time period may be no more than 1000 ms, 1500 ms, 2000 ms, 2500 ms or 3000 ms. In some particular examples, the maximum threshold time period is 2000 ms.

The method may comprise setting one of the test time periods as the rescue time period, i.e. one of the time periods that has specifically been tested may be set as the rescue time period. Alternatively, the method may further comprise calculating the rescue time period based on the at least one test time period, e.g., by interpolation, extrapolation, or averaging.

In some examples, the method further comprises setting as the rescue time period the first test time period that results in a maximum travel speed of the elevator car that is an acceptable speed. It will be understood that the learning process ends once a rescue time period is set, and that therefore setting the first test time period that gives an acceptable maximum travel speed as the rescue time period brings the learning process to an end at the earliest possible opportunity. This avoids carrying out further unnecessary tests, using further time periods, once a time period has been identified that results in a maximum travel speed that is an acceptable speed.

In some examples each of the test time periods may be different to each of the other test time periods, i.e., no test time periods are tested more than once in a particular learning process.

The method may comprise first releasing the machine brake for a first test time period, and, if the maximum travel speed reached by the elevator car in the first time period is not an acceptable speed, subsequently releasing the machine brake for one or more additional test time periods, wherein each additional test time period is different compared to the preceding time period. Thus, an initial test time period is tested, and if it does not result in an acceptable maximum travel speed, one or more further test time periods are tested, where each test time period is different to the last (i.e., the time period that was tested immediately before). It may be that each additional test time period is different compared to all of the preceding time periods (i.e., no test time period is used twice in a particular occasion of carrying out the method, i.e., for a particular learning phase).

The first test time period may be a minimum time period, i.e., the process may begin by first testing the minimum time period of all the time periods to be tested. In some examples each additional test time period may be incrementally increased compared to the preceding time period. Thus, the test time periods will be gradually stepped up during the process. Where the first test time period giving an acceptable maximum travel speed is chosen as the rescue time period, this stepping up approach ensures that the minimum rescue time period that results in an acceptable maximum travel speed is used, thus preventing unnecessarily high speed of the elevator car and therefore reducing brake wear.

Alternatively, the first test time period may be a maximum time period, i.e., the process may begin by first testing the maximum time period of all the time periods to be tested. In some examples each additional test time period may be incrementally decreased compared to the preceding time period. Thus, the test time periods will be gradually stepped down during the process. This will result in a rescue time period with the fastest acceptable speed that does not exceed a maximum acceptable speed. This may reduce the number of rescue time periods required to be used to move the car to a landing during a rescue operation.

Further alternatively, each additional test time period may be either greater than or less than the preceding additional test time period, wherein whether the additional test time period is greater than or less than the preceding additional test time period is based on the result of checking whether the maximum travel speed for the preceding test time period is an acceptable speed. Thus, the next test time period used for testing may be chosen based on the result of the check for the previous test time period. If a test time period results in a maximum travel speed that is too high, the next time period may be shorter, whereas if a test time period results in a maximum travel speed that is too low, the next test time period may be longer.

Further alternatively, the additional test time periods may be chosen at random.

The size of increments between sequential additional test time periods may be pre-set, set automatically or selected by a user. The size of increments between sequential additional test time periods may be varied based on said checking. For example, they may be varied such that if a maximum travel speed resulting from a particular test time period is far from an acceptable speed, the size of increment to the next test time period is larger, whereas if the maximum travel speed resulting from a particular test time period is close to an acceptable speed, the size of increment to the next test time period is smaller.

In some examples the method is carried out during installation of the elevator system. This ensures that an appropriate rescue time period is set in the elevator system before it begins its normal operation.

In some examples, in addition or alternatively, the method is carried out after replacement of the machine or the machine brake. Changing one or both of these components can change the braking properties of the system, and therefore possibly change what is the most appropriate rescue time period for which to lift the machine brake during a rescue operation.

In some examples, the elevator system further comprises an elevator controller. In some examples, the method is carried out after replacement of the elevator controller. Alternatively, the method may further comprise storing the rescue time period in a first memory of a first elevator controller, exchanging the first elevator controller for a second elevator controller, and transferring the rescue time period to a second memory of the second elevator controller. Thus, where the method described herein has previously been used to set a rescue time period for an existing elevator system, and the elevator controller of that system is then replaced, the rescue time period may be transferred to a memory of the new elevator controller, thus avoiding the need to repeat the learning process.

The elevator controller may comprise the rescue time period learning system.

In some examples the method is carried out automatically by the elevator controller. By being carried out automatically, it will be understood that the elevator controller is arranged to carry out each of the steps of the method without requiring input from an external operator. That said, it will of course be understood that the method may be triggered to begin by an input from an external user, e.g., it may be started by a maintenance person making an appropriate input to the elevator controller.

In some examples the releasing the machine brake for at least one test time period is carried out when the elevator car is empty of passengers and additional loads or when the elevator car contains passengers and additional loads having a mass equal to a maximum load limit of the elevator car. It will be understood that in the second of these situations the car is in a state referred to as "full load", i.e., containing its maximum allowed or rated load.

Generally, where an elevator car is attached to a counterweight, the mass of the counterweight is selected so that the counterweight balances the elevator car when the elevator car is half-loaded (i.e., containing a load having a mass equal to half the total load allowed for the elevator car). Thus, when the car is either empty of additional load and passengers, or is fully loaded, the imbalance between the elevator car and the counterweight is at its greatest, resulting in the largest possible acceleration of the elevator car, due to this imbalance, when the machine brake is lifted. Thus, releasing the machine brake under either of these two conditions will result in a maximum possible acceleration of the elevator car, that might ever be experienced during a rescue operation, and therefore allows the highest maximum travel speed that is possible for a given test time period to be achieved. This therefore allows the "worst case scenario" to be tested, and ensures that a maximum travel speed reached during a rescue operation will not be greater than a maximum travel speed reached when carrying out a test run for that test time period.

In some examples, the elevator system or the elevator car further comprises a load detection device, arranged to detect the mass of any passengers and/or additional loads present within the elevator car. The method may further comprise checking that the mass of any passengers and/or additional loads present within the elevator car is either at a minimum or at a maximum, and only if the mass of any passengers and/or additional loads present within the elevator car is either at a minimum or at a maximum, releasing the machine brake for at least one test time period, at the end of which the machine brake is engaged.

In some examples, the machine is a rotary motor (e.g., a hoisting machine or a beam-climbing machine), or the machine is a linear motor.

It will be appreciated that the present disclosure further relates to the use of the rescue time period, set according to the method described above, during a rescue operation.

Thus, according to a fourth aspect of this disclosure there is provided a method of operating an elevator system, comprising, during a learning phase learning a rescue time period using the method described above; and subsequently, during a rescue operation and in response to receipt of a rescue operation trigger, releasing the machine brake for the rescue time period.

According to a fifth aspect, there is provided an elevator system comprising: an elevator car; a machine, arranged to move the elevator car; a machine brake, arranged to brake the machine, wherein braking of the machine by the machine brake brakes motion of the elevator car; the elevator system being configured to carry out the method according to the fourth aspect.

According to a sixth aspect, there is provided an elevator system comprising: an elevator car; a machine, arranged to move the elevator car; a machine brake, arranged to brake the machine, wherein braking of the machine by the machine brake brakes motion of the elevator car; a rescue time period learning system, the rescue time period learning system configured to carry out a method comprising: releasing the machine brake for at least one test time period, at the end of which the machine brake is engaged; detecting a corresponding at least one maximum travel speed of the elevator car reached as a result of releasing the machine brake for each at least one test time period; checking whether each at least one maximum travel speed is an acceptable speed; and setting the rescue time period based upon said checking; and an elevator controller, the elevator controller arranged to release the machine brake for the rescue time period during a rescue operation and in response to receipt of a rescue operation trigger.

It will be understood that a rescue operation takes place after the elevator car has undergone an emergency stop in which motion of the elevator car has been braked (i.e., stopped) by the machine brake. This may be triggered, for example, by detection of a malfunction of a component of the elevator system or by pressing of an emergency stop button by a passenger. Often an emergency stop results in the elevator car being stopped in a position within the hoistway of the elevator system that is not at one of the landings, or may not even be a sufficiently small distance from one of the landings to allow safe debarkation of the elevator car. In such circumstances the elevator car is moved to a nearby landing of the elevator system using a rescue operation, in which the machine brake is lifted for a particular time period, so that the elevator car begins to move. According to the present disclosure, the machine brake is lifted specifically for the rescue time period.

In some examples the rescue operation trigger is input by a maintenance person. This helps to ensure that the rescue operation process, including lifting of the machine brake, is started only once a maintenance person is in an appropriate position to be able to supervise the rescue operation.

In some examples the releasing the machine brake for the rescue time period is carried out automatically by the elevator system (e.g., the elevator controller). This helps to ensure accuracy in the amount of time that the machine brake is lifted for since the elevator controller, i.e., an electronic device, can achieve greater accuracy than a maintenance person manually timing the rescue time period. Accuracy is particularly important given that the rescue time period is usually short (i.e., too short to be timed by a maintenance person).

In some examples the elevator system comprises a motion detection device, arranged to detect motion of the elevator car. The method may further comprise during releasing the machine brake for the rescue time period, monitoring for a signal from the motion detection device indicating motion of the elevator car; the method further comprising: if the signal indicating motion of the elevator car is received, continuing to release the machine brake beyond the end of the rescue time period; and if the signal indicating motion of the elevator car is not received, engaging the machine brake if the rescue time period has expired.

It is established during the method described above, for setting the rescue time period, whether the rescue time period that is set results in movement of the elevator car. Thus, it can be known whether movement of the elevator car is expected as a result of releasing the machine brake for the rescue time period. Provided that movement of the elevator car is expected, it can then be established whether the motion detection device is operating correctly. If motion of the elevator car is expected but none is detected, it can be determined that the motion detection device is not functioning correctly, and therefore it is important that the machine brake be re-engaged. Alternatively, if movement is successfully detected by the motion detection device (and is expected), then it can be established that the motion detection device is operating correctly, and it can therefore be established that the machine brake can be safely left open beyond the expiry of the rescue time period, since motion of the elevator car can be monitored using the motion detection device. Braking of the elevator car can then be determined based on the speed determined by the motion detection device.

If the signal indicating motion of the elevator car is not received, the machine brake is engaged if the rescue time period has expired. This could mean that the machine brake is engaged at the end of the rescue time period. Additionally, it may also mean that the machine brake is engaged after the end of the rescue time period, e.g., if a signal from the motion detection device is initially detected during the rescue time period and beyond the end of the rescue time period, so that the brake is held open, but later the signal ceases to be received, at which point the machine brake is engaged again. This second scenario could alternatively be considered as a further, separate emergency stop.

Features of any aspect or example described herein may, wherever appropriate, be applied to any other aspect or embodiment described herein. In particular, the rescue time period learning system may be arranged to carry out any of the method steps described herein above. Where reference is made to different examples or sets of examples, it should be understood that these are not necessarily distinct but may overlap.

DRAWING DESCRIPTION

Certain preferred examples of this disclosure will now be described, by way of example only, with reference to the accompanying drawings, in which.

DETAILED DESCRIPTION

Figure 1:
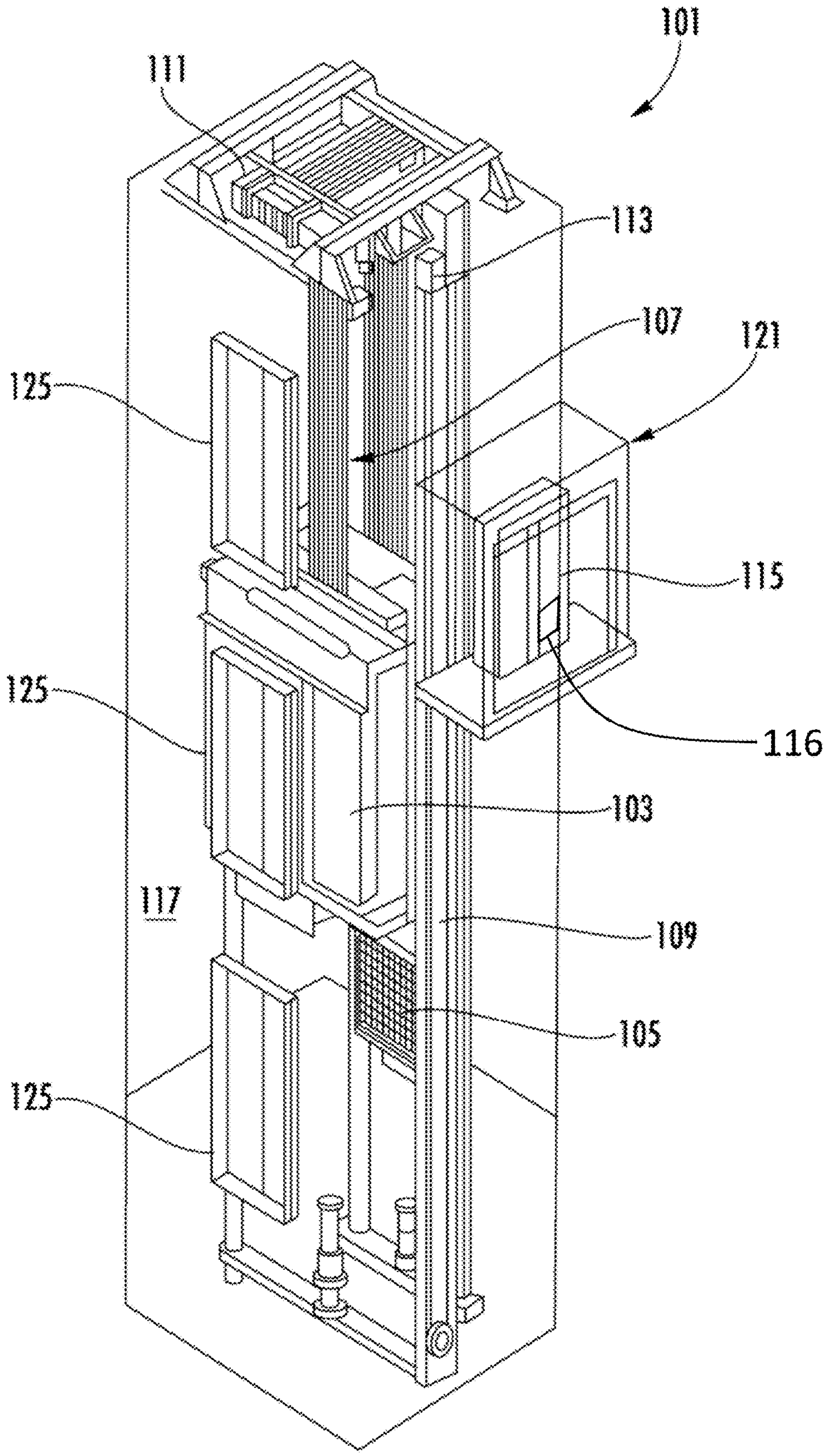
FIG. 1 is a schematic illustration of an elevator system according to an aspect of the present disclosure.

FIG. 1 is a perspective view of an elevator system 101 including an elevator car 103, a counterweight 105, a tension member 107, a guide rail 109, a machine 111, a motion detection device 113, and an elevator controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109. In particular, the mass of the counterweight 105 is equal to the mass of the elevator car plus half of the maximum load permitted in the elevator car 103. Thus, the counterweight 105 exactly balances the elevator car 103 when the elevator car 103 contains a load having a mass equal to half of the maximum load permitted for the elevator car 103.

The tension member 107 engages the machine 111, which is part of an overhead structure of the elevator system 101. The machine 111 is configured to control movement between the elevator car 103 and the counterweight 105. The motion detection device 113 may be mounted on a fixed part at the top of the elevator hoistway 117, such as on a support or guide rail, and may be configured to provide position signals related to a position of the elevator car 103 within the elevator hoistway 117, and thereby indicating whether the elevator car 103 is moving, by indicating whether or not the position of the elevator car 103 is changing. In other embodiments, the motion detection device 113 may be directly mounted to a moving component of the machine 111, or may be located in other positions and/or configurations as known in the art. The motion detection device 113 can be any device or mechanism for monitoring a position of an elevator car and/or counterweight, and therefore their movement, as known in the art. For example, without limitation, the motion detection device 113 can be an encoder, sensor, or other system and can include velocity sensing, absolute position sensing, etc., as will be appreciated by those of skill in the art.

The elevator controller 115 is located, as shown, in a controller room 121 of the elevator hoistway 117 and is configured to control the operation of the elevator system 101, and particularly the elevator car 103. For example, the elevator controller 115 may provide drive signals to the machine 111 to control the acceleration, deceleration, leveling, stopping, etc. of the elevator car 103. The elevator controller 115 may also be configured to receive position and/or motion signals from the motion detection device 113. When moving up or down within the elevator hoistway 117 along guide rail 109, the elevator car 103 may stop at one or more landings 125 as controlled by the elevator controller 115. Although shown in a controller room 121, those of skill in the art will appreciate that the elevator controller 115 can be located and/or configured in other locations or positions within the elevator system 101. In one embodiment, the elevator controller may be located remotely or in the cloud. The elevator controller 115 includes a rescue time period learning system 116, the operation of which is described below with reference to FIG. 6. Although shown as part of the elevator controller 115, it will be understood that the rescue time period learning system 116 may be provided as a separate component.

Figure 2:
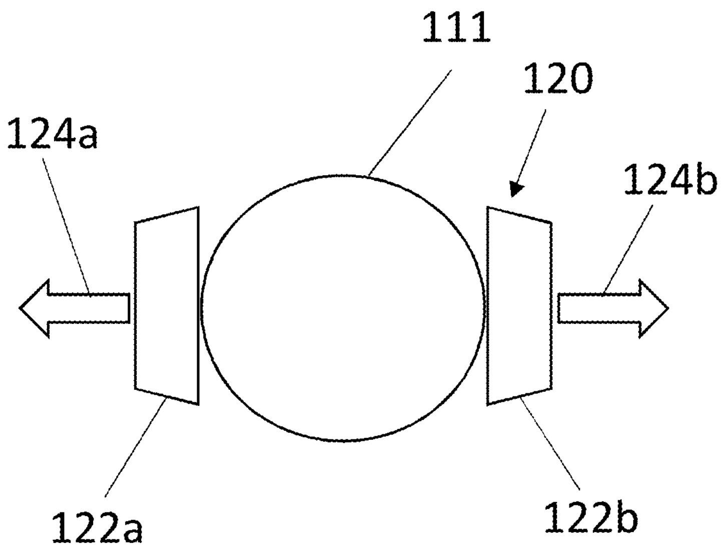
FIG. 2 is a schematic illustration of the machine and machine brake of the elevator system of FIG. 1.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117. The machine 111 is braked by a machine brake 120, seen in FIG. 2. The machine brake 120 includes two braking pads 122*a*, 122*b*. They apply pressure to the machine 111 when braking, in order to brake the machine 111 with friction. When the brake pads 122*a*, 122*b* are lifted, by being moved along the brake release directions 124*a*, 124*b*, the machine brake 120 is lifted and the machine 111 (and therefore the elevator car 103) is free to move.

Although the elevator system 101 of FIG. 1 is shown and described with a roping system including a tension member 107, elevator systems that employ other methods and mechanisms of moving an elevator car within an elevator hoistway may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car.

When the elevator car 103 undergoes a rescue operation, to allow rescue of passengers who are trapped in the elevator car 103 when the elevator car 103 has been stopped between landings 125, the machine brake 120 is lifted to allow at least a small movement of the elevator car 103. If no movement is detected by sensors of the elevator system 101, e.g., by the motion detection device 113, then the machine brake must be re-engaged. If the sensors of the elevator system 101, e.g., the motion detection device 113, appear to be operating properly then the machine brake 120 can be left open and control of the motion of the elevator car 103 in the standard way by the elevator controller 115 can be resumed.

Figure 3:
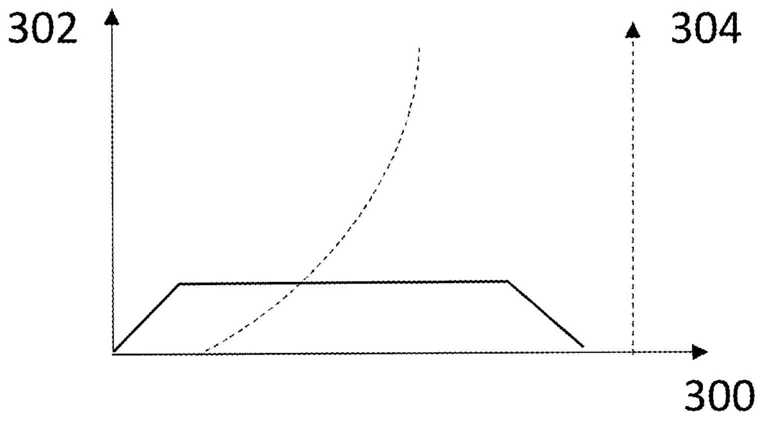
FIGS. 3-5 are graphs representing lifting of the machine brake for different time periods, and the resulting maximum travel speeds achieved by the elevator car.
Figure 4:
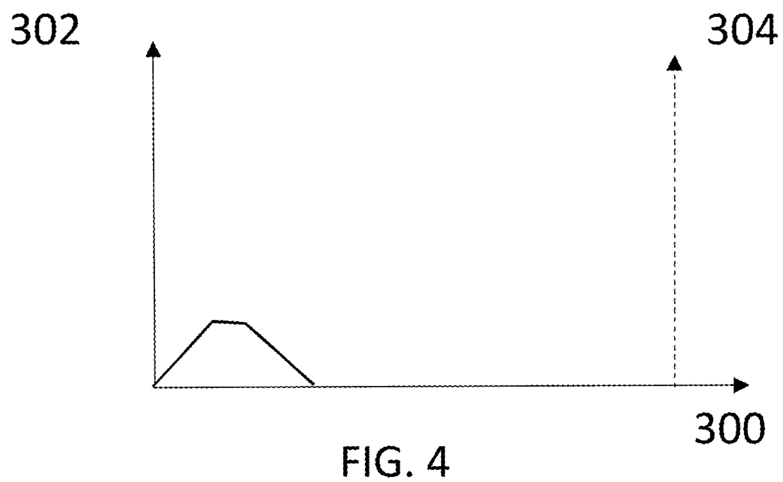
Figure 5:
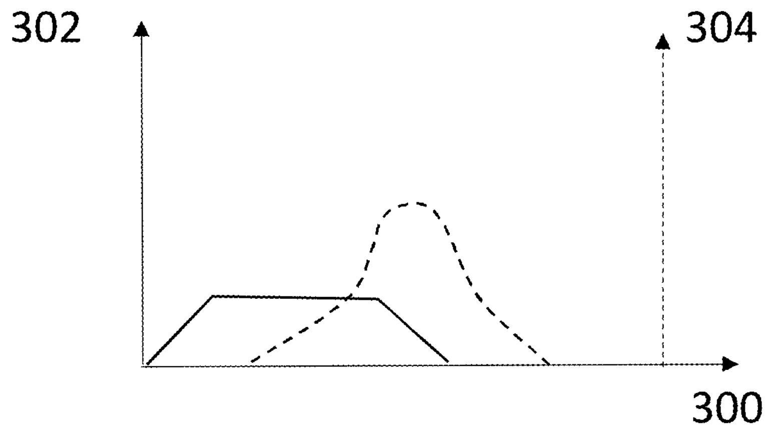

It is important that the machine brake 120 is lifted for an appropriate period of time during the rescue operation, as illustrated by FIGS. 3-5.

FIGS. 3-5 are graphs, showing time along the x-axis 300, and containing two y-axes. The left-hand y-axis 302, with a solid line, represents brake lifting distance, as is presented on the graphs by a solid line. The right-hand y-axis 304, with a dashed line, represents the speed of movement of the elevator car 103.

FIG. 3 shows the effect when the machine brake 120 is lifted for too long. It can be seen that the speed of movement of the elevator car 103 increases quickly, and the speed will therefore become much too high. This risks both the comfort of passengers being rescued, but also their safety, since the elevator car 103 will undergo a rapid deceleration when the machine brake 120 is reapplied, and the car and its passengers will be jolted sharply.

In contrast, FIG. 4 shows the effect when the machine brake 120 is not lifted for a long enough period of time. In this case the elevator car 103 does not move at all. Thus, this will make the rescue operation impossible since the lifting of the machine brake 120 does not result in movement of the elevator car 103 and therefore cannot be used to move the elevator car 103 close enough to a landing 125 to enable safe debarkation.

FIG. 5 shows the speed (dashed line) of an elevator car 103 as the machine brake 120 is lifted for an appropriate amount of time during a rescue operation. The elevator car 103 achieves movement, such that it is successfully moved closer to a landing 125, but the machine brake 120 is applied sufficiently soon after release that the speed of the elevator car 103 does not rise too high.

It is a goal of the present disclosure to learn, for a given elevator installation, an appropriate lifting time for the machine brake 120 during a rescue operation. This time period is referred to herein as a rescue time period. This is achieved using the method described below with reference to FIG. 6, which is carried out by the rescue time period learning system 116.

Figure 6:
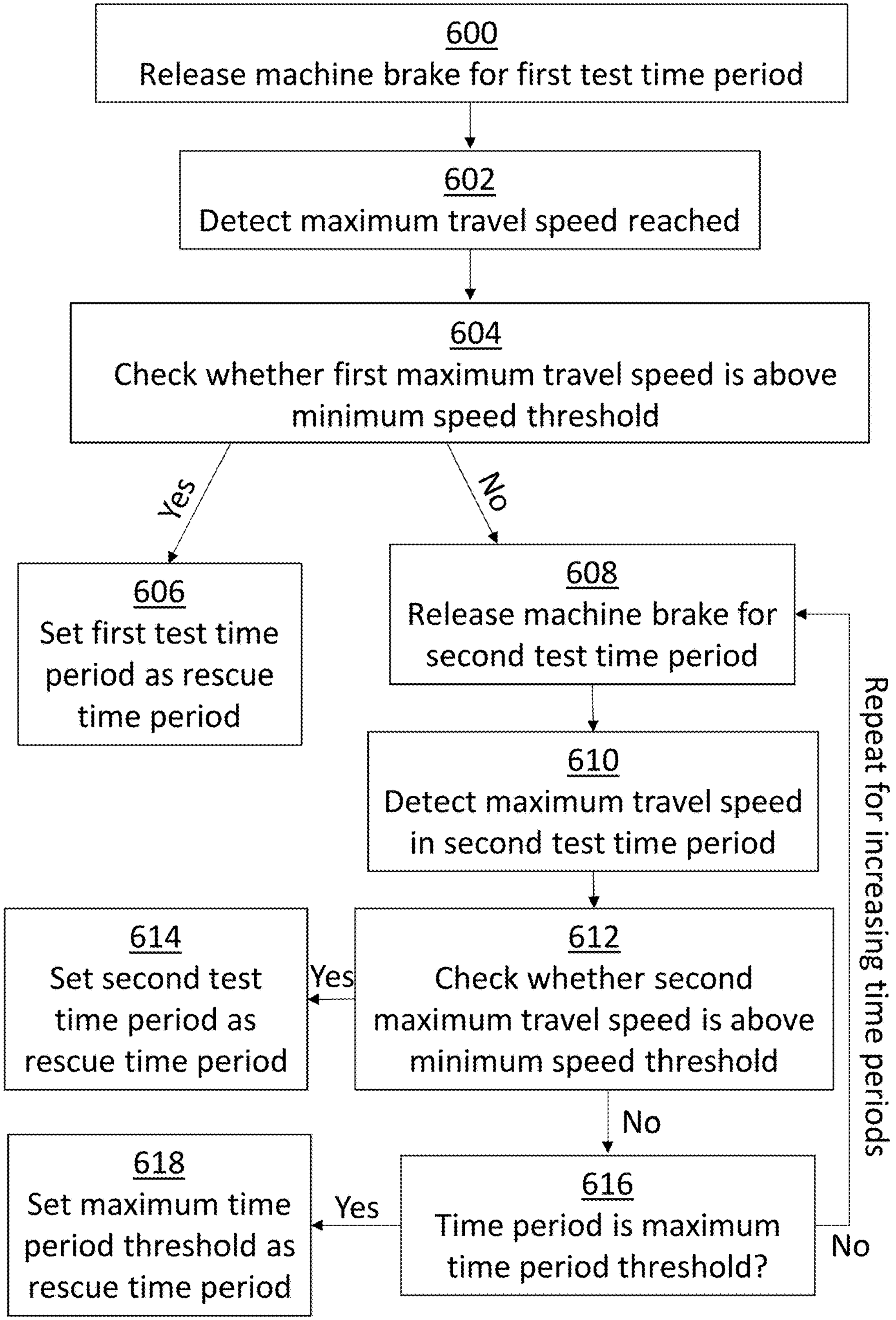
FIG. 6 is a flow chart illustrating a method of learning a rescue time period by an elevator system according to an aspect of the present disclosure.

The method starts at step 600. In this step the machine brake 120 is lifted for a first test time period. In this example the first test time period is a minimum threshold time period (i.e., the shortest time period to be tested during the learning phase, where the learning phase is what is illustrated in FIG. 6). In this example the first test time period is 500 ms.

At step 602 (which may be carried out concurrently with step 600), the rescue time period learning system 116 detects the maximum travel speed that is reached as a result of the machine brake 120 being lifted for the first time period. The maximum travel speed may be reached during the first test time period, but also may be reached after the end of the first time period, e.g., if the elevator car 103 is still accelerating even as the machine brake 120 begins to be re-engaged. At step 604 it is checked whether the maximum travel speed that the elevator car 103 reaches is above a minimum speed threshold.

If lifting the machine brake 120 for the first test time period does result in a maximum travel speed of the elevator car 103 that is above the minimum speed threshold, then the first test time period is set as the rescue time period, at step 606.

If lifting the machine brake 120 for the first test time period results in a maximum travel speed of the elevator car 103 that is below the minimum speed threshold, then the method proceeds to step 608, at which the machine brake 120 is released for a second time period. In this example, the second time period is longer than the first time period.

At step 610 (which may be carried out concurrently with step 608), the rescue time period learning system 116 detects the maximum travel speed that is reached as a result of the machine brake 120 being lifted for the second time period. At step 612 it is checked whether the maximum travel speed that the elevator car 103 reaches is above a minimum speed threshold.

If lifting the machine brake 120 for the second test time period does result in a maximum travel speed of the elevator car 103 that is above the minimum speed threshold, then the second test time period is set as the rescue time period, at step 614.

If lifting the machine brake 120 for the second, longer test time period results in a maximum travel speed of the elevator car 103 that is below the minimum speed threshold, then the method proceeds to step 616, at which it is checked whether the second test time period, used in the preceding testing steps, is equal to (or over) a maximum time period threshold. If it is not, then the method returns to step 608 and repeats the method again for another test time period, longer than the second, and keeps repeating this process for incrementally increasing test time periods, until either one produces a maximum travel speed above the minimum speed threshold, and the method moves to step 614, or until the time period has been increased to be equal to, or greater than, the maximum time period threshold. At that point, the method proceeds to step 618, in which the maximum time period threshold is set as the rescue time period. In this example the maximum time period threshold is 2000 ms. Thus, if no time periods between 500 ms and 2000 ms produce a speed that is above the minimum speed threshold then 2000 ms is used as the rescue time period.

In this example the minimum speed threshold is 0.1 m/s. This is sufficiently fast that reasonable movement of the elevator car 103 is achieved, but sufficiently slow that passenger comfort and safety is achieved, and wear on the brake pads 122*a*, 122*b* is not excessive.

Figure 7:
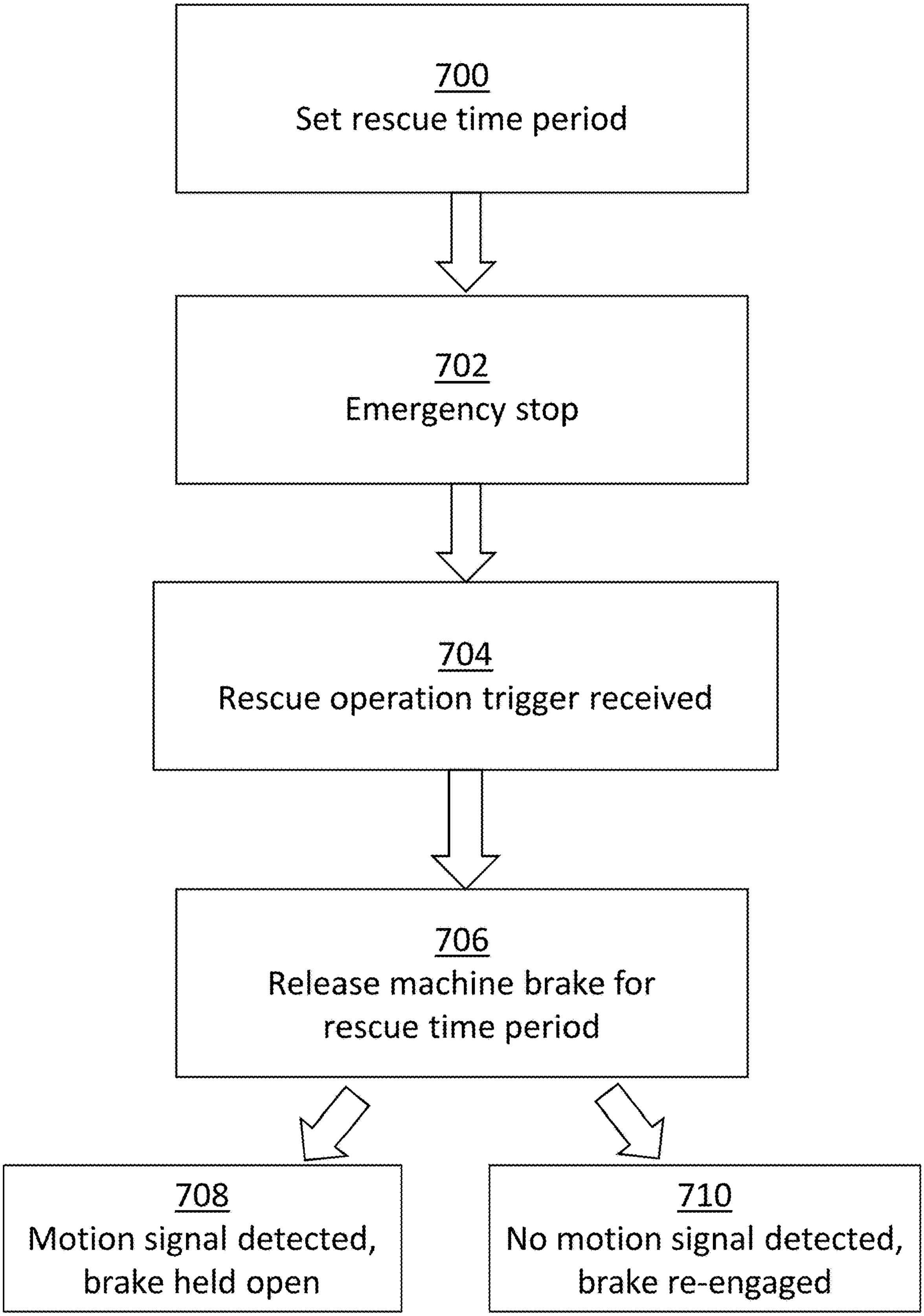
FIG. 7 is a flow chart illustrating a method of operating an elevator system according to an aspect of the present disclosure.

This learning phase represented in FIG. 6 is shown as stage 700 in FIG. 7. FIG. 7 shows how the rescue time period set using the method of FIG. 6 is used during operation of the elevator system 101.

First a problem with the elevator system 101 causes it to undergo an emergency stop, at step 702. During an emergency stop 702 the elevator car 103 is braked by the machine brake 120 (and optionally also by separate safety brakes, not shown).

A maintenance person then begins the process of a manual rescue operation. Before this is done the maintenance person may make one or more safety checks (locally or remotely), and may control certain components of the elevator system 101 (e.g., release the safety brakes). Once the elevator system 101 is in a ready state, the maintenance person triggers the rescue operation to begin, at step 704, by inputting a command to the elevator controller 115 (again either locally or remotely).

In response to the command, the elevator controller 115 lifts the machine brake 120 for at least the length of the rescue time period at step 706, as set by the rescue time period learning system 116. If a signal is detected from the motion detection device 113 during the rescue time period, then the elevator controller 115 continues to hold the machine brake 120 open past the end of the rescue time period, at step 708. In this case since the sensors used to monitor motion of the elevator car 103—including the motion detection device 113—seem to be operating correctly, the elevator car 103 can be moved safely and therefore the machine brake 120 can be held open.

Alternatively, if no signal is detected from the motion detection device 113, despite motion being expected, then the machine brake 120 is re-engaged at step 710. This can be at the end of the rescue time period, if no motion is detected within the rescue time period, or the machine brake can be re-engaged after the end of the rescue time period where there is initially a signal from the motion detection device 113 (and so the machine brake 120 is held open), but then later the signal from the motion detection device 113 ceases, at which point the machine brake 120 is re-engaged.

It will be appreciated by those skilled in the art that the disclosure has been illustrated by describing one or more specific aspects thereof, but is not limited to these aspects; many variations and modifications are possible, within the scope of the accompanying claims.

What is claimed is:

1. A method of learning a rescue time period by an elevator system (101), the elevator system (101) comprising an elevator car (103) moved by a machine (111), and a machine brake (120) arranged such that braking of the machine (111) by the machine brake (120) brakes motion of the elevator car (103), the method comprising:

releasing the machine brake (120) for at least one test time period, at the end of which the machine brake (120) is engaged;

detecting a corresponding maximum travel speed of the elevator car (103) reached as a result of releasing the machine brake (120) for each at least one test time period;

checking whether each maximum travel speed is an acceptable speed; and setting the rescue time period based upon said checking.

2. The method as claimed in claim 1, wherein the acceptable speed comprises a speed that is greater than or equal to a minimum speed threshold.

3. The method as claimed in claim 2, wherein the minimum speed threshold is 0.1 m/s.

4. The method as claimed in claim 1, wherein the acceptable speed comprises a speed that is less than or equal to a maximum speed threshold.

5. The method as claimed in claim 4, wherein the maximum speed threshold is 0.3 m/s.

6. The method as claimed in claim 1, wherein each at least one test time period is greater than or equal to a minimum threshold time period.

7. The method as claimed in claim 6, wherein the minimum threshold time period is at least 500 ms.

8. The method as claimed in claim 1, wherein each at least one test time period is less than or equal to a maximum threshold time period, the method further comprising:

if no test time period results in the maximum travel speed being the acceptable speed, setting the maximum threshold time period as the rescue time period.

9. The method as claimed in claim 8, wherein the maximum threshold time period is no more than 2000 ms.

10. The method as claimed in claim 1, comprising setting as the rescue time period a first test time period that results in the maximum travel speed of the elevator car (103) that is the acceptable speed.

11. The method as claimed in claim 1, comprising first releasing the machine brake (120) for a first test time period, and if the maximum travel speed reached by the elevator car (103) in the first time period is not the acceptable speed, subsequently releasing the machine brake (120) for one or more additional test time periods, wherein each additional test time period is different compared to the preceding time period.

12. The method as claimed in claim 1, wherein the method is carried out during installation of the elevator system (101), or after replacement of the machine (111) or the machine brake (120).

13. The method as claimed in claim 1, wherein the elevator system (101) further comprises an elevator controller (115), and wherein the method is carried out automatically by the elevator controller (115).

14. The method as claimed in claim 1, wherein the releasing the machine brake (120) for at least one test time period is carried out when the elevator car (103) is empty of passengers and additional loads or when the elevator car contains passengers and additional loads having a mass equal to a maximum load limit of the elevator car (103).

15. A method of operating an elevator system (101), comprising, during a learning phase learning a rescue time period using the method of claim 1; and subsequently, during a rescue operation and in response to receipt of a rescue operation trigger, releasing the machine brake (120) for the rescue time period.

16. The method as claimed in claim 15, wherein the rescue operation trigger is input by a maintenance person, and wherein the releasing the machine brake (120) for the rescue time period is carried out automatically by the elevator system (101).

17. The method as claimed in claim 15, wherein the elevator system (101) comprises a motion detection device (113), arranged to detect motion of the elevator car (103), the method comprising during releasing the machine brake for the rescue time period, the elevator system monitoring for a signal from the motion detection device (113) indicating motion of the elevator car (103); the method further comprising:

if the signal indicating motion of the elevator car (103) is received, continuing to release the machine brake (120) beyond the end of the rescue time period; and if the signal indicating motion of the elevator car (103) is not received, engaging the machine brake (120) if the rescue time period has expired.

18. A rescue time period learning system (116) for an elevator system (101), the rescue time period learning system (116) configured to carry out a method as claimed in claim 1.

19. An elevator system (101) comprising:

an elevator car (103);

a machine (111), arranged to move the elevator car (103);

a machine brake (120), arranged to brake the machine (111), wherein braking of the machine (111) by the machine brake (120) brakes motion of the elevator car (103);

and a rescue time period learning system (116) as claimed in claim 18.

* * * * *